United States Patent [19]

Lynch

[11] Patent Number: 4,686,696

[45] Date of Patent: Aug. 11, 1987

[54] TRANSMISSION LINE SIGNAL SENSING CIRCUIT EMPLOYING MEANS FOR CONSERVING POWER, ESPECIALLY FOR USE WITH A TELEPHONE DISCONNECT CIRCUIT, AND ASSOCIATED METHOD

[75] Inventor: Daniel Lynch, Jackson, N.J.

[73] Assignee: Keptel, Inc., Tinton Falls, N.J.

[21] Appl. No.: 803,801

[22] Filed: Dec. 2, 1985

[51] Int. Cl.$^4$ .................. H04M 3/26; H04B 3/46
[52] U.S. Cl. .................... 379/22; 379/399; 379/29
[58] Field of Search ............ 179/175.3 R, 175.3 F, 179/175, 175.1 R, 175.2 R, 81 R; 307/114, 129, 296 R, 296 A, 518

[56] References Cited

U.S. PATENT DOCUMENTS

| | | | |
|---|---|---|---|
| 3,739,107 | 6/1973 | Spencer | 179/175 |
| 3,790,723 | 2/1974 | Stewart | 179/175 |
| 3,943,305 | 3/1976 | Hagedorn | 179/175 |
| 4,039,751 | 8/1977 | Couturier et al. | 179/15 |
| 4,041,255 | 8/1977 | Cambridge et al. | 179/175 |
| 4,126,771 | 11/1978 | Proctor et al. | 232/175 |
| 4,143,250 | 3/1979 | Simokat | 179/175 |
| 4,169,220 | 9/1979 | Fields | 179/175 |
| 4,258,236 | 3/1981 | Conklin et al. | 179/175 |
| 4,489,221 | 12/1984 | Walker et al. | 179/19 |
| 4,536,617 | 8/1985 | Perry | 179/81 |
| 4,550,225 | 10/1985 | Lynch et al. | 179/175.3 R X |
| 4,560,842 | 12/1985 | Homer | 179/175.3 R X |

Primary Examiner—Stafford D. Schreyer
Attorney, Agent, or Firm—Kenyon & Kenyon

[57] ABSTRACT

An apparatus and method for sensing a predetermined tone signal transmitted on a transmission line, such as a telephone transmission line, and for generating a signal indicating the presence of the tone signal. The apparatus comprises a tone detector circuit including an amplifier, bandpass filter and comparator, a power supply for generating power for the detector circuit from a voltage present on the transmission line and logic circuitry for gating pulses of power from the power supply to the detector circuit on a periodic basis thereby to enable the detector circuit to check for the presence of the tone signal during the durations of the power pulses.

34 Claims, 5 Drawing Figures

TRANSMISSION LINE SIGNAL SENSING CIRCUIT EMPLOYING MEANS FOR CONSERVING POWER, ESPECIALLY FOR USE WITH A TELEPHONE DISCONNECT CIRCUIT, AND ASSOCIATED METHOD

BACKGROUND OF THE INVENTION

The present invention relates to transmission line signal sensing circuits and particularly to telephone disconnect circuits and especially telephone disconnect circuits having means for conserving power supplied via the telephone transmission lines.

A problem with prior art telephone disconnect circuits, in which a signal is transmitted on a telephone line to the disconnect circuit to thereby allow the subscriber telephone device to be disconnected from the telephone line so that the operation of the telephone line can be tested, arises from the fact that the circuits either must be powered from power sources located at the subscriber location, or power is to be supplied over the telephone lines. In the former situation, a power supply must be provided and the subscriber must pay for the expense of supplying power and the power supply adds bulk to the disconnect circuit. In the latter situation, the disconnect circuit and accompanying detection circuitry for detecting the disconnect signal may load down the telephone lines, and often cannot be designed so that sufficient power can be supplied from the ordinarily meager currents available over the telephone lines.

SUMMARY OF THE INVENTION

Accordingly, it is an object of the present invention to provide a transmission line signal sensing circuit which is powered by power supplied over the transmission lines, and which yet does not load down the transmission lines or impair operation of a subscriber device coupled to the transmission line.

It is furthermore an object of the present invention to provide a telephone line signal sensing circuit which is powered by power supplied over the telephone lines, and which can be used in conjunction with a telephone disconnect circuit.

It is furthermore another object of the present invention to provide a telephone line signal sensing circuit which requires minimal power for operation.

It is yet still another object of the present invention to provide a telephone line signal sensing circuit which employs a novel scanning method for determining if a signal, e.g., a disconnect signal, has been transmitted along the telephone line, and which shuts down the power supply to portions of the circuitry when the signal is not detected.

It is still yet another object of the present invention to provide a telephone line signal sensing circuit which employs circuitry for shutting down the power supply to portions of the circuitry when the signal is not detected for a sufficient time interval.

It is still yet another object of the present invention to provide a telephone line signal sensing circuit which employs circuitry for providing a variable bandpass filter for detecting a tone signal transmitted along the telephone lines.

These and other objects of the present invention are achieved by apparatus for sensing a predetermined signal transmitted on a transmission line and for generating an output signal indicating the presence of the predetermined signal comprising means for detecting the presence of the predetermined signal, power supply means for generating power for the detecting means from a voltage present on the transmission line and logic circuit means for gating pulses of power from the power supply means to the detecting means on a periodic basis thereby to enable the detecting means to check for the presence of the predetermined signal during the durations of said pulses.

The objects of the invention are also achieved by a method for sensing a predetermined signal transmitted on a transmission line, as will be explained in more detail below.

Other objects, advantages and features of the present invention will be apparent from the detailed description which follows.

BRIEF DESCRIPTION OF THE DRAWINGS

The invention will be described in greater detail in the following detailed description with reference to the drawing figures in which.

DETAILED DESCRIPTION

Figure 1:
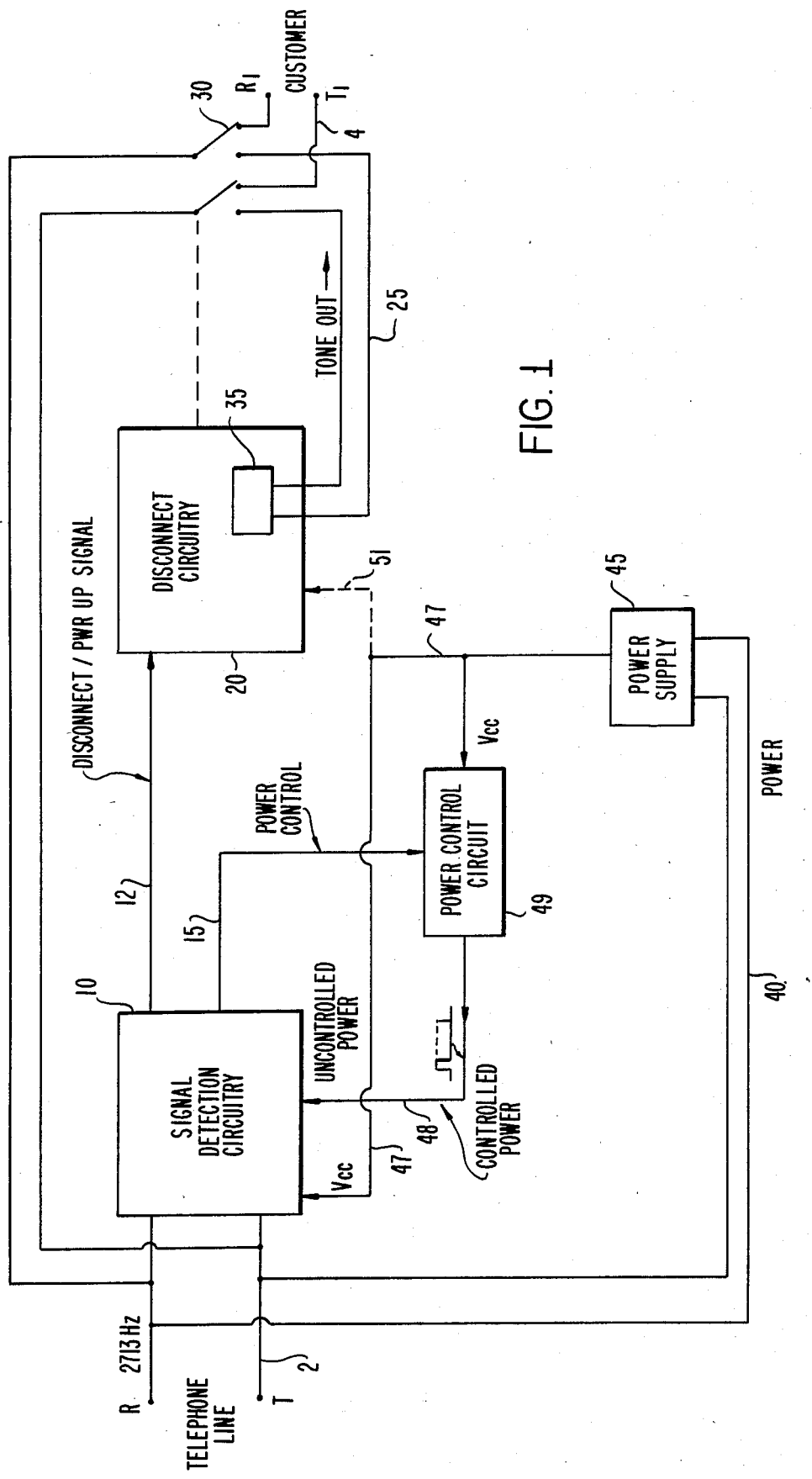
FIG. 1 is a block diagram of the overall system according to the invention.

With reference now to the drawings, FIG. 1 shows an overall block diagram of the system according to the present invention. The incoming telephone lines from the central office are indicated by reference numeral 2. The telephone lines 2 are fed to signal detection circuitry 10, which detects the presence of a specified signal, e.g., a tone signal transmitted down the telephone line for disconnecting a telephone coupled to the telephone lines at 4. Signal detection circuitry 10 includes an output 12, upon which a disconnect/power up signal is generated when the disconnect signal transmitted over the telephone lines has been detected for a sufficient period of time. The disconnect/power up signal is transmitted to disconnect circuitry 20, which operates a switching device 30, for example, a relay or a semiconductor device could be used. Switching device 30 disconnects the customer telephone from the telephone lines, and may connect thereto an output 25 of the disconnect circuit. The disconnect circuitry 20 may include a tone generator 35, the purpose of which is to transmit various tones on the telephone lines so that the bandwidth of the telephone lines, via a measure of the signal quality received at the central office, can be determined, in response to the detection of a disconnect signal on the telephone lines 2. The output of signal detection circuitry 10 on line 12 is denoted a disconnect/power up signal, because it can also be used to power up portions of the disconnect circuitry 20, e.g., tone generator 35.

In addition to the above, the system of FIG. 1 includes a power supply 45 which is powered by power supplied on the telephone lines 2. The regulated output of the power supply on line 47 is supplied to a power control circuit 49, the output 48 of which is controlled by a signal 15 from the signal detection circuitry 10. Controlled output power on line 48 is supplied to the signal detection circuitry 10 and uncontrolled power on line 47 is supplied to portions of signal detection circuit 10 which must be powered at all times and optionally may be supplied to disconnect circuitry 20 via line 51. (Disconnect/power up signal 12 may be used to enable the supply of power to circuit 20.) The purpose of power control circuit 49 is to supply power to circuit 10 on a periodic basis and to shut down the supply of power when a disconnect signal is not being received. In order to do this, signal detection circuitry 10 periodically scans, when a pulse of power is supplied thereto, the input telephone lines for the presence of the disconnect signal. Power for the logic circuitry in detection circuitry 10 which institutes the scanning operation on a periodic basis is supplied via uncontrolled power line 47. This means that the power available on power line 47 is supplied to portions of the signal detection circuitry 10 at all times. In contrast, controlled power on line 48 is supplied to portions of the signal detection circuitry 10 only on a periodic basis. In a preferred embodiment of the invention, pulses of power on line 48 are first supplied for 31.25 milliseconds at approximately half second intervals, resulting in a duty cycle of about 6%. In this manner, a very low average idle current of less than 25 microamps can be obtained.

In accordance with the invention, the pulsed output power on line 48 is pulsed for a short amount of time, in a preferred embodiment, 31.25 msecs, and a determination is made during that time whether the disconnect signal of the proper frequency (usually 2713 Hz), has been detected. Because of the relatively short time period in which detection is made, a large detection bandwidth of approximately 200 Hz is obtained. Thus, a signal in the range of approximately 100 Hz below 2713 Hz and 100 Hz above 2713 Hz will result in the detection of a disconnect signal. This bandwidth, however, is not sufficiently accurate, and may be influenced by extraneous noise. Accordingly, if a disconnect signal is detected within the 200 Hz bandwidth, the circuit automatically changes to a long sampling rate mode, in which the detection circuitry detects whether the disconnect signal has been received within a 0.5 second time window. In order to improve accuracy, the disconnect signal preferably should be detected within successive 0.5 second time windows. In a preferred embodiment, 7 time windows are employed, such that the disconnect signal must be detected for approximately 3.7 seconds before a signal on line 12 is issued to the disconnect circuitry 20 for disconnecting the customer owned telephone and switching the output of tone generator 35 onto the telephone lines.

Figure 2A:
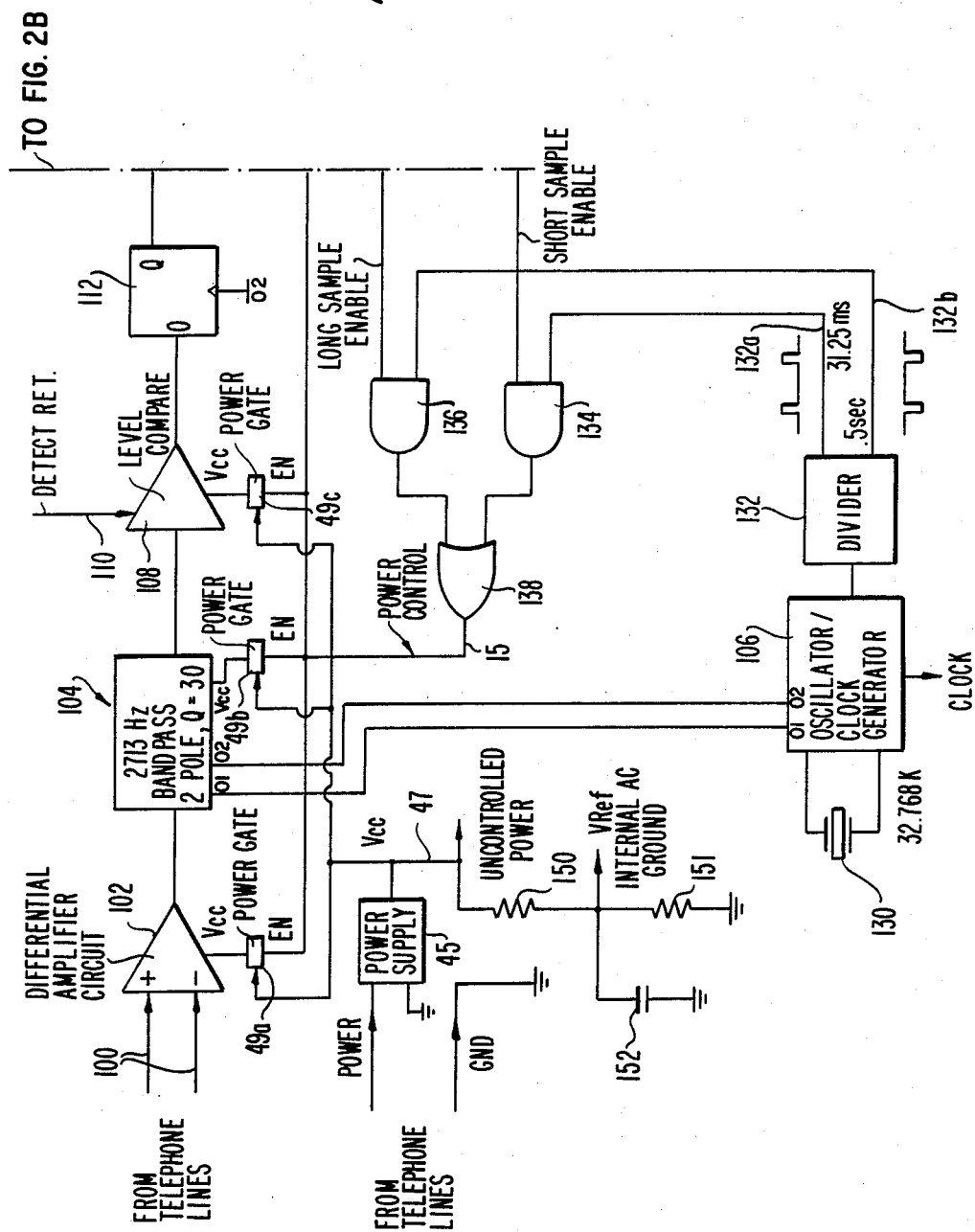
FIGS. 2A, 2B are a more detailed block diagram of part of the circuit of FIG. 1.
Figure 2B:
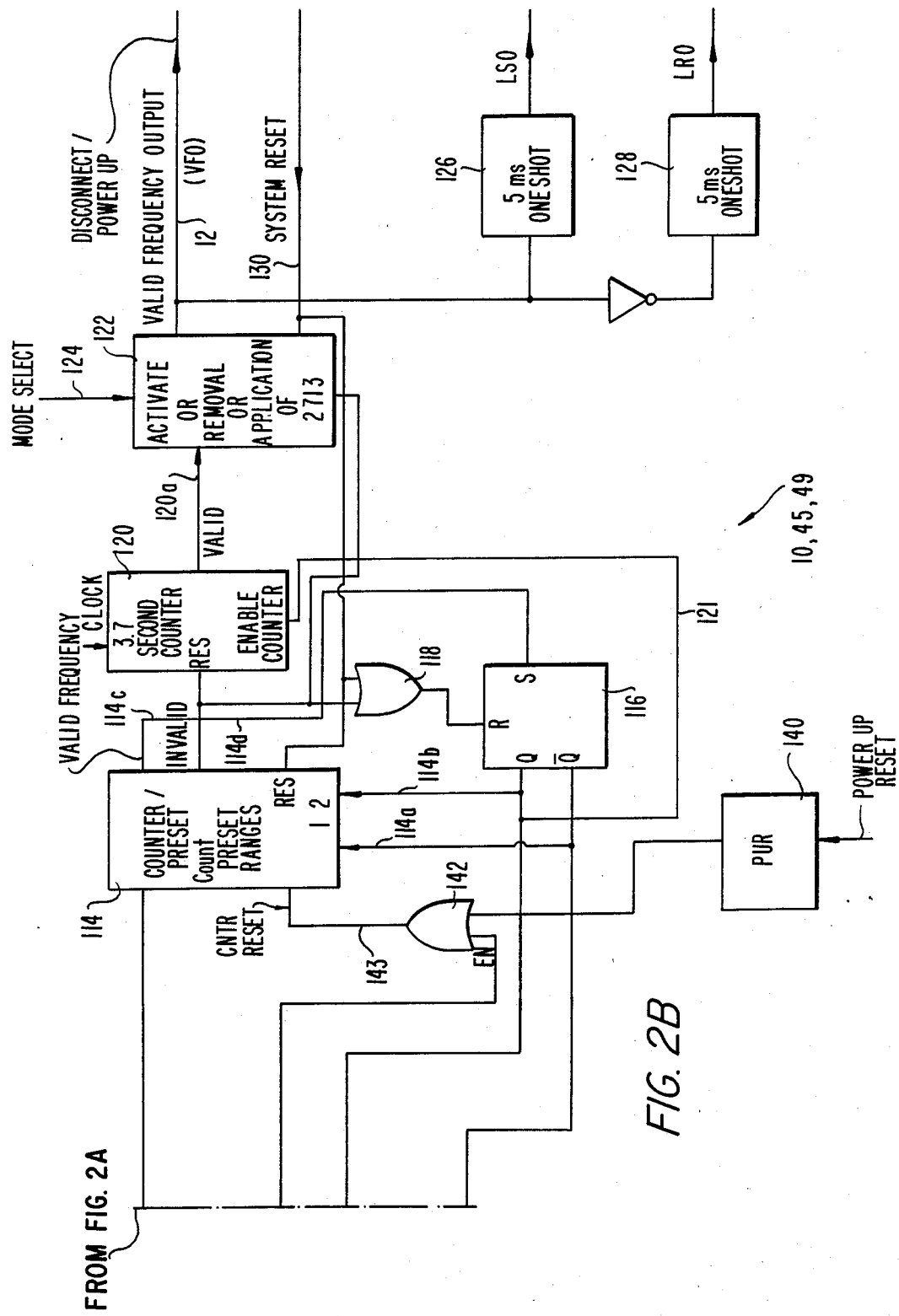

FIG. 2 shows details of the signal detection circuitry 10, power supply 45 and power control circuit 49. Signal detection circuitry 10 comprises inputs 100 coupled to telephone lines 2. Inputs 100 from telephone lines 2 are coupled to a differential amplifier 102, the output of which is coupled to a 2713 Hz bandpass filter 104. Bandpass filter 104 is preferably a two-pole filter having a Q factor of 30. Bandpass filter 104 may be a digital filter of the switched capacitance type, employing two 180° out of phase clock signals from an oscillator/clock generator 106. Such digital filters are known to those skilled in the art. The output of filter 104 is supplied to a comparator 108, which compares the output of filter 104 with a reference value on line 110. The output of comparator 108 is fed to a synchronizing circuit 112, which preferably comprises a D flip-flop supplied with a clock signal which may be an inverted form of one of the clock signals from clock generator 106. The output of D flip-flop 112 is supplied to a presettable counter circuit 114, having two outputs, an output 114c to denote that a valid frequency has been detected by the bandpass filter and an output 114d which indicates that no valid frequency has been detected. Counter 114 has two presettable count ranges 1 and 2 controlled by lines 114a and 114b.

The valid frequency output 114c of presettable counter 114 is supplied to the set input of a set/reset flip-flop 116. The invalid frequency output 114d of presettable counter 114 is supplied to one input of an OR gate 118, the output of which is supplied to the reset input of flip-flop 116. The invalid frequency output 114d of presettable counter 114 is also supplied to a 3.7 second counter 120, an output of which indicates that a valid frequency has been detected for the 3.7 second duration discussed above. Counter 120 is enabled by an output of flip-flop 116 via line 121. The valid frequency output 114c of counter 120 is supplied to an activation logic circuit 122, the purpose of which is to provide the ability to operate the circuit in two modes. The output of logic circuitry 122 is disconnect/power up signal line 12, which output is supplied to the disconnect circuitry 20 for disconnecting the telephone from the telephone line and optionally for powering up the disconnect circuitry. Logic circuitry 122 provides two modes of operation. In a first mode of operation, the disconnect signal 12 is issued after the 2713 Hz tone signal has been detected for the minimum 3.7 second time interval. In a second mode of operation, logic circuitry 122 issues disconnect signal 12 only after the tone disconnect signal has been detected for 3.7 seconds and the tone signal has been removed from the input. This will be explained in greater detail below. The mode of operation is determined by the logic level on input 124. The output of logic circuitry 122, which comprises disconnect/power up signal 12, may also be fed to two single shots 126 and 128. These signal shots can be used to supply pulses which are generated respectively, at the leading edge of the disconnect signal on line 12 and at the trailing edge of the disconnect signal on line 12. These signals can be used if, e.g., a latching relay 30 is used in conjunction with the disconnect circuitry.

Oscillator/clock generator 106 utilizes a crystal reference source 130, preferably having a frequency of 32.768 kilohertz. The output of oscillator/clock generator 106 is fed into a divider 132 having two outputs, a pulse train 132a having narrow pulses, preferably of a duration of 31.25 msecs, spaced at 531.25 msecs and a second pulse train 132b having pulses of 0.5 second duration spaced at 531.25 msecs. The second pulse train may be an inverted form of the first pulse train. The two outputs of divider 132 are fed to respective AND gates 134 and 136. AND gate 134 receives the $\overline{Q}$ output of flip-flop 116 at its other input and AND gate 136 receives the Q output of flip-flop 116 as its other input. The outputs of AND gates 134 and 136 are coupled to an OR gate 138, the output of which is the power control signal 15 (EN) which is coupled to the power control circuitry 49. In the embodiment shown in FIG. 2, the power control circuitry comprises a plurality of control gates 49a, 49b and 49c. Each gate 49a, 49b and 49c is enabled by the power control signal 15, and when enabled, allows the regulated voltage from the power supply on line 47 to be supplied to portions of the circuitry of the signal detection circuitry 10. Preferably, the only portions of the circuit 10 to which power should be controlled, are the linear circuit elements, i.e., the differential amplifier 102, the bandpass filter 104 and the level comparator 108, as these components draw relatively higher currents. The other elements of the circuit, which comprise digital logic elements, can be supplied with constant power from line 47, as these digital logic elements may comprise CMOS type integrated circuits, which require very little power. Alternatively, the entire circuit shown in FIG. 10 can be built on a custom integrated circuit, with the digital logic elements preferably comprising CMOS technology.

A power up reset (PUR) circuit 140, which can comprise a typical RC time delay stage, is also provided. A power up reset signal is provided to this stage upon initial power up of the device. The output of the power up reset stage 140 is coupled to one input of OR gate 142. The other input of OR gate 142 is coupled to the power control signal 15. The output of OR gate 142 is supplied to the counter reset input ($\overline{\text{CNTR RESET}}$) of presettable counter 114. Thus, on initial power up the presettable counter 114 is initially reset to a zero count. The power control signal 15, as will be explained below, also enables the presettable counter 114 to be reset for each successive time window in which counting takes place.

In addition to the above, a resistor divider stage comprising resistors 150 and 151 is coupled to a capacitor 152 for providing a floating internal AC ground for the linear circuit elements 102, 104 and 108.

Figure 3:
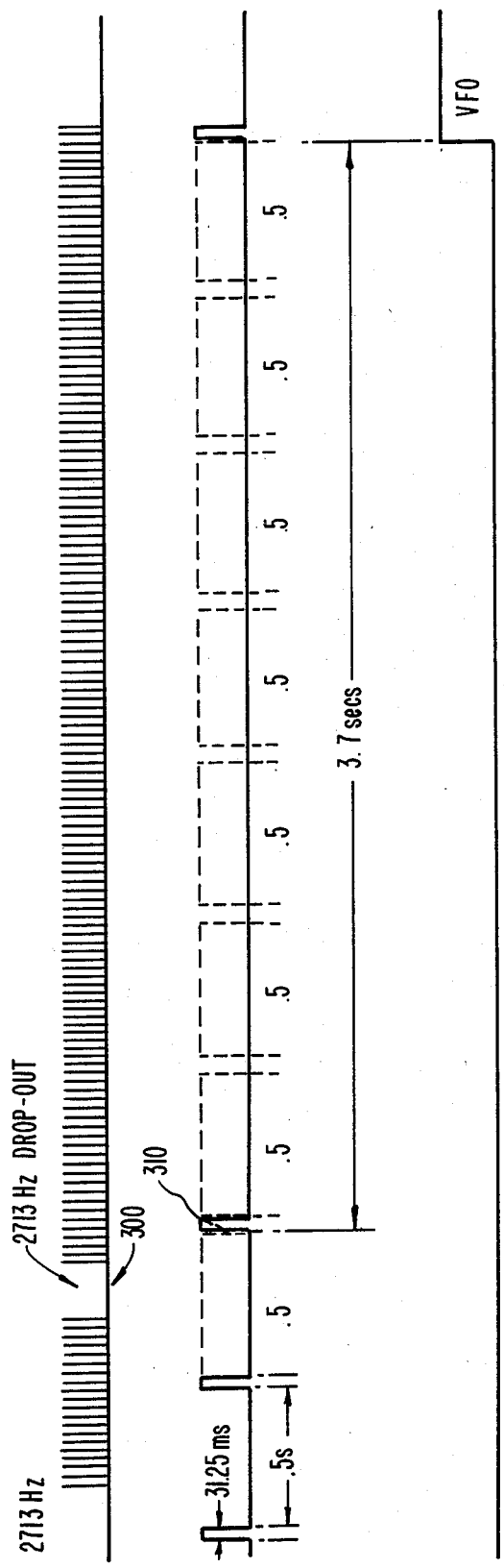
FIG. 3 is a timing chart showing operation of the circuit of the invention.

The operation of the circuit of FIG. 2 will now be explained. Differential amplifier 102, bandpass filter 104 and comparator 108 can detect the presence of the 2713 Hz tone signal on the telephone lines only during the time when power is gated to these circuits via power gates 49a, 49b and 49c. As explained above, clock/generator 106 and divider 132 produce a 31.25 msec pulse spaced every 531.25 msecs. This pulse is gated through AND gate 134 when the $\overline{Q}$ output is high, and then gated through OR gate 138. Thus, when control line 15 is high, power gates 49a, 49b and 49c are enabled, allowing power to be supplied to differential amplifier 102, bandpass filter 104 and comparator 108. Accordingly, as shown in FIG. 3, if the 2713 Hz tone signal is detected during the 31.25 msec sampling time, and it is of sufficient magnitude so that it exceeds the comparison reference signal on line 110, an output will be generated by comparator 108. The output of comparator 108 is supplied to flip-flop 112, thereby synchronizing the signal with the system clock. This output is supplied to presettable counter 114, which has two preset ranges determined by the signals on lines 114a and 114b. In a first range, presettable counter 114 issues an output signal on line 114c only if a certain number of counts determining an approximately 200 Hz bandwidth are obtained. Thus, for a 2713 Hz input signal, which has a period of 368.6 microseconds, the optimum number of counts is approximately 84 within a 31.25 msec time interval. Preset range 1, as determined by line 114a, comprises a range of approximately 81 to 87 counts, which corresponds approximately to a range of 2592 to 2784 Hz, which approximates the 200 Hz bandwidth obtainable when a 31.25 msec sampling width is used.

Assuming a 2713 Hz signal has been received and the correct number of counts (81 to 87 counts) have been determined by presettable counter circuit 114, the output 114c of counter 114 goes to a high logic level, thereby setting flip-flop 116. By setting flip-flop 116, the Q output goes high and the $\overline{Q}$ goes low. Accordingly, this allows the 0.5 second pulses from divider circuit 132 to be supplied through AND gate 136 and OR gate 138. The short sampling pulses (31.25 msecs) are gated off by AND gate 134. Thus, a pulse train having 0.5 second pulses appears on power control line 15, and the differential amplifier 102, bandpass filter 104 and comparator 108 are now enabled for 0.5 second time intervals. At the same time, the power control signal 15 having 0.5 second pulse widths is gated by OR gate 142 to the counter reset line 143. Negative going 31.25 millisecond pulses thus are provided to the counter reset input ($\overline{\text{CNTR RESET}}$) to reset the counter prior to each 0.5 second time interval, as the counter reset line is a negative logic line.

Figure 4:
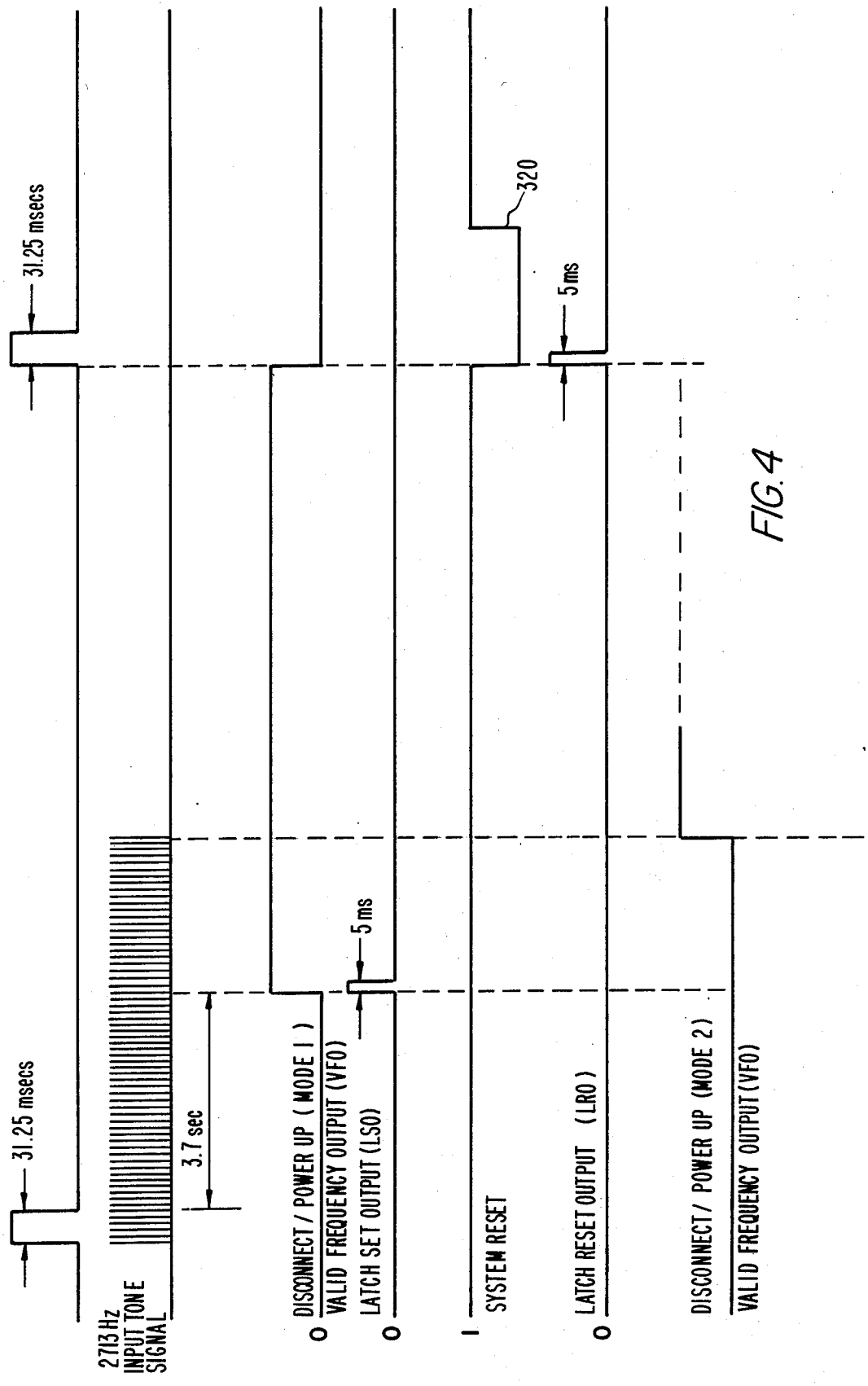
FIG. 4 is an additional timing chart showing operation of the circuit of the invention.

As shown in FIG. 3, once the 2713 Hz signal is detected for a 31.25 msec time interval, the circuit goes into the long sampling state as determined by the output of flip-flop 116. If the 2713 Hz disconnect signal is not detected for the entire 0.5 second interval, then an invalid frequency signal will appear on line 114d of counter 114, thereby resetting flip-flop 116 via OR gate 118 and setting the circuit back into the short 31.25 msec sampling state. When flip-flop 116 is set after the 2713 Hz signal is detected for a 31.25 msec time interval, however, the Q output goes high, thereby selecting preset range 2 of counter 114. Preset range 2 of counter 114 defines a range of approximately 20 Hz, corresponding to counts of 1351 to 1361 counts. If, during a first 0.5 second time interval, the 2713 Hz signal, as defined by a count within the prescribed range is not obtained, as shown in FIG. 3 at 300, where the 2713 Hz signal disappears during a 0.5 second count, the circuit goes back into the short sampling state as shown by the beginning of another 31.25 msec pulse at 310. If the 2713 Hz signal is detected again in this 31.25 msec interval, the circuit again goes into the longer 0.5 second pulse sampling state. If, during this 0.5 second time interval, the 2713 Hz signal is continuously detected, as determined by a count of counter 114 in preset range 2(1351 to 1361 counts), a valid frequency signal on line 114c is generated, placing flip-flop 116 into in its set state. As long as the 2713 Hz signal is detected, as determined by a count within preset range 2, flip-flop 116 will be maintained in its set state, allowing an additional 0.5 second pulse to be gated through AND gate 136 and OR gate 138, thereby allowing bandpass filter 104 to sample the input signal for an additional 0.5 second time window. At the same time, the negative going portion of the pulse train on line 15 resets counter 114 for the next count. If a predetermined count within the preset range 2 is again obtained, then a valid frequency output signal is generated on line 114c, maintaining flip-flop 116 in the set state and the circuit in the long sampling state. This is repeated preferably for seven consecutive 0.5 second time windows, as long as the 2713 Hz signal is continuously detected. If it is not, the circuit goes back into the power saving short sampling state Thus, the 2713 Hz signal must be detected for 7 consecutive 0.5 second time intervals. During this time, a counter 120 enabled by the output of flip-flop 116 and clocked by the system clock continues to count and if the 3.7 second time interval is reached, a signal is generated at its output 120a, which is supplied to activation circuitry 122. Counter 120 is enabled by the Q output of flip-flop 116, such that it is only enabled during the long sampling state. The output of activation circuitry 122 is supplied as disconnect/power up signal 12 to the disconnect circuitry 20 of FIG. 1. Alternatively, the outputs of singleshots 126 and 128, as shown in FIG. 4, can be provided to the disconnect circuitry 20 if a latching relay is used as relay 30. The output of single shot 126 can be provided to disconnect the telephone subscriber telephone, and the output of single shot 128 can be provided to the latching relay to reconnect the subscriber telephone. This is shown in FIG. 4, where the output of single shot 126 is generated on the leading edge of the disconnect/power up signal 12 while the output of single shot 128 is generated at the trailing edge of the disconnect/power up signal. The trailing edge of the disconnect/power up signal may be generated upon the provision of a system reset pulse 30 as shown in FIG. 4 on the system reset line 130. The system reset signal can be generated automatically by a suitable timer circuit or it can be generated by the transmission on the telephone line and detection of another tone signal of a different frequency.

As shown in FIG. 4, activation circuit 122 allows a second mode of operation in which the tone signal must be detected for the 3.7 sec time interval (7 time windows) and also must be removed before the disconnect/power up signal on line 12 is generated.

Accordingly, the circuit described allows for a minimal current draw from the connected telephone lines during the short sampling state, thereby allowing the circuit to be used in applications where current draw must be at a minimum so that operation of telephone equipment is not affected. The circuit allows for extremely small currents to be drawn from the telephone lines during the short sampling state when the 2713 Hz disconnect signal is not detected, as the portions of the circuitry which draw most current are on for approximately only 6% of the time. As soon as a disconnect signal is detected, then the circuit goes into a long sampling pulse state wherein accurate determination of the input signal frequency is made for successive time periods, and a correlation is made such that a disconnect/power up signal is generated only if the input tone signal has been detected accurately for successive time intervals.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. Apparatus for sensing a predetermined signal transmitted on a transmission line and for generating an output signal indicating the presence of the predetermined signal comprising:
    means for detecting the presence of the predetermined signal;
    power supply means for generating power for said detecting means from a voltage present on said transmission line; and
    logic circuit means for gating pulses of power from said power supply means to said detecting means on a periodic basis thereby to enable the detecting means to check for the presence of the predetermined signal during the durations of said pulses, said detecting means generating said output signal at an output thereof in response to the presence of said predetermined signal during the duration of said pulses of power.

2. The apparatus recited in claim 1 wherein said predetermined signal is a tone signal and said detecting means checks for the presence of the tone signal within a defined bandwidth.

3. The apparatus recited in claim 2 wherein said logic circuit means comprises means for supplying first pulses of power to said detecting means, said first pulses of power having a first predetermined duration, whereby said detecting means is turned on during the duration of a pulse, thereby allowing the detecting means to detect whether said tone signal is present on the transmission line.

4. The apparatus recited in claim 3, wherein said logic circuit means further comprises means for supplying second pulses of power to said detecting means, said second pulses of power having a second predetermined duration greater than said first predetermined duration, said second pulses being supplied to said detecting means only if said detecting means has detected the presence of said tone signal during the duration of said first pulses.

5. The apparatus recited in claim 4 wherein said logic circuit means comprises means for generating said output signal indicating the presence of said tone signal only after said tone signal has been detected during the durations of successive ones of said second pulses.

6. The apparatus recited in claim 5 wherein said logic circuit means comprises oscillator means for providing two pulses trains, one having pulses of said first duration and the other having pulses of said second duration.

7. The apparatus recited in claim 6 wherein said logic circuit means comprises counter means for counting a number of pulses of said tone signal within said first and second durations, and for generating a signal if the number of pulses counted falls within respective preset ranges.

8. The apparatus recited in claim 7 wherein said counter means comprises presettable counter means having two preset ranges, a first of said ranges corresponding to a count of pulses during said first duration and a second of said ranges corresponding to a count of pulses during said second duration.

9. The apparatus recited in claim 8, further comprising second counter means for counting to a predetermined count if said tone signal is detected during the durations of successive ones of said second pulses.

10. The apparatus recited in claim 8 wherein said detecting means comprises amplifier means coupled to said transmission line, bandpass filter means coupled to said amplifier means and comparator means for comparing an output of said filter means to a preset threshold level.

11. The apparatus recited in claim 10 wherein said filter means comprises a switched capacitance bandpass filter.

12. The apparatus recited in claim 10, further comprising synchronizing means coupled to an output of said comparator means, an output of said synchronizing means being coupled to a counting input of said presettable counter means.

13. The apparatus recited in claim 9, further comprising logic means coupled to an output of said second counter means, said logic means comprising means for generating said output signal indicating the presence of said tone signal and having two selectable modes of operation.

14. The apparatus recited in claim 13 wherein said first mode of operation generates said output signal after said tone signal has been detected for the durations of a predetermined number of successive ones of said second pulses and said second mode of operation generates said output signal only after said tone signal has been detected for the durations of a predetermined number of successive ones of said second pulses and said tone signal has terminated.

15. The apparatus recited in claim 8 wherein said logic circuit means comprises selectable logic gate means having said two pulse trains as inputs, said gate means being selected by an output of flip-flop means having an input coupled to an output of said presettable counter means.

16. The apparatus recited in claim 2 wherein said output signal indicating the presence of said tone signal is supplied to means for disconnecting a subscriber device coupled to said transmission line.

17. The apparatus recited in claim 16 wherein said subscriber device comprises a telephone.

18. The apparatus recited in claim 16 wherein said means for disconnecting further comprises tone generator means, said tone generator means being coupled to said transmission line when said subscriber device is disconnected.

19. A method for sensing a predetermined signal transmitted on a transmission line and for generating an output signal indicating the presence of the predetermined signal comprising:
 detecting the presence of the predetermined signal with detecting means;
 generating power for said detecting means from a voltage present on said transmission line;
 gating pulses of power to said detecting means on a periodic basis thereby to enable the detecting means to check for the presence of the predetermined signal during the durations of said pulses and generating the output signal at an output of the detecting means in response to the presence of said predetermined signal during the duration of said pulses of power.

20. The method recited in claim 19 wherein said predetermined signal is a tone signal and said step of detecting checks for the presence of the tone signal within a defined bandwidth.

21. The method recited in claim 20 wherein said step of gating comprises supplying first pulses of power to said detecting means, said first pulses of power having a first predetermined duration, whereby said detecting means is turned on during the duration of a pulse, thereby allowing the detecting means to detect whether said tone signal is present on the transmission line.

22. The method recited in claim 21, wherein said step of gating further comprises supplying second pulses of power to said detecting means, said second pulses of power having a second predetermined duration greater than said first predetermined duration, said second pulses being supplied to said detecting means only if said detecting means has detected the presence of said tone signal during the duration of said first pulses.

23. The method recited in claim 22 wherein said step of generating an output signal comprises generating said output signal indicating the presence of said tone signal only after said tone signal has been detected during the durations of successive ones of said second pulses.

24. The method recited in claim 23 wherein said step of gating further comprises the step of providing two pulses trains, one having pulses of said first duration and the other having pulses of said second duration.

25. The method recited in claim 24 wherein said step of gating comprises counting a number of pulses of said tone signal within said first and second durations, and generating a signal if the number of pulses counted falls within respective preset ranges.

26. The method recited in claim 25 wherein said step of counting comprises counting with a counter having two preset ranges, a first of said ranges corresponding to a count of pulses during said first duration and a second of said ranges corresponding to a count of pulses during said second duration.

27. The method recited in claim 26, further comprising the step of counting to a predetermined count if said tone signal is detected during the durations of successive ones of said second pulses.

28. The method recited in claim 26 wherein said step of detecting comprises amplifying said tone signal, filtering said tone signal and comparing said amplified, filtered tone signal to a preset threshold level.

29. The method recited in claim 27, further comprising the step of selectably generating said output signal indicating the presence of said tone signal from among two selectable modes of operation.

30. The method recited in claim 29 wherein said first mode of operation comprises generating said output signal after said tone signal has been detected for the durations of a predetermined number of successive ones of said second pulses and said second mode of operation comprises generating said output signal only after said tone signal has been detected for the durations of a predetermined number of successive ones of said second pulses and said tone signal has terminated.

31. The method recited in claim 24 wherein said step of gating comprises selecting one of said two pulse trains, and supplying the selected pulse train to said detecting means.

32. The method recited in claim 20 further comprising the step of supplying said output signal indicating the presence of said tone signal to means for disconnecting a subscriber device coupled to said transmission line.

33. The method recited in claim 32 wherein said step of supplying comprises supplying said output signal to means for disconnecting a telephone from a telephone line.

34. The method recited in claim 32, further comprising the step of generating a further tone signal and coupling said further tone signal to said transmission line when said subscriber device is disconnected for testing purposes.

* * * * *